No. 811,398. PATENTED JAN. 30, 1906.
P. J. HOFFMANN.
HORSESHOE.
APPLICATION FILED JAN. 23, 1905.

WITNESSES
INVENTOR
P. J. Hoffmann

UNITED STATES PATENT OFFICE.

PHILIP JACOB HOFFMANN, OF PITTSBURG, PENNSYLVANIA.

HORSESHOE.

No. 811,398. Specification of Letters Patent. Patented Jan. 30, 1906.

Application filed January 23, 1905. Serial No. 242,279.

*To all whom it may concern:*

Be it known that I, PHILIP JACOB HOFFMANN, a citizen of the United States of America, residing at Pittsburg, in the county of Allegheny and State of Pennsylvania, have invented certain new and useful Improvements in Horseshoes, of which the following is a specification, reference being had therein to the accompanying drawings.

This invention relates to certain new and useful improvements in horseshoes, and has for its object the provision of a novel form of attachment which is adapted to be secured to horseshoes to prevent the animals wearing the shoes from slipping upon ice-covered ground or smooth surfaces.

Another object of this invention is to provide an attachment which can be easily and quickly secured to a horseshoe at any time it may be desired.

Briefly described, my invention resides in providing a horseshoe with removable calks, which are adapted to be used upon the horseshoes when the animals wearing the same are to travel over ice-covered ground or smooth surfaces and in detachably securing the calks to the shoe. I dispense with the use of screw-threads, which heretofore have been used in attaching calks to shoes. I have also constructed a horseshoe particularly adapted for use in cold weather when the ground is frozen or covered with ice, and the construction which enters into this type of shoe, together with the details thereof, will be hereinafter more fully described.

Reference will now be had to the drawings accompanying this application, wherein like numerals of reference designate corresponding parts throughout the several views, in which—

Figure 1:
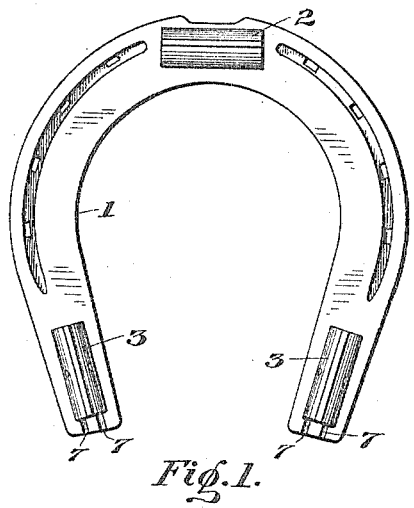
Figure 2:
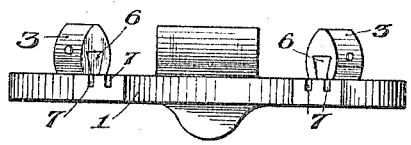
Figure 3:
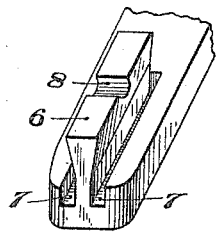
Figure 4:
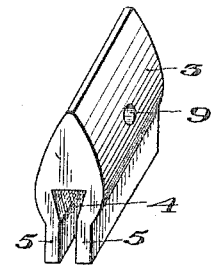
Figure 5:
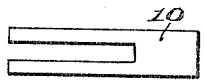

Figure 1 is a bottom plan view of a shoe constructed in accordance with my invention. Fig. 2 is an end view of the same. Fig. 3 is a fragmentary perspective view of one end of my improved shoe. Fig. 4 is a detail perspective view of one of the calks of the shoe. Fig. 5 is a detail view of a pin employed to secure the removable calks in position on the shoe.

In the drawings, 1 designates the shoe, which is of the ordinary contour and is provided with a toe-calk 2 and with removable heel-calks 3 3. One of these heel-calks is separately illustrated in Fig. 4 of the drawings, and upon referring to Fig. 4 it will be observed that the calk is formed with a central dovetailed groove 4 and with longitudinally-disposed ribs 5 5, said dovetailed groove 4 being adapted to receive a wedge-shaped lug 6, that is formed at the end of and integral with the shoe 1. There is, it will be observed, one of these lugs on each heel of the shoe and one of the calks 3 on each lug; but as the lug and the calk on each heel are similar to the lug and the calk at the other end a description of one lug and one calk will be sufficient. The shoe is provided on its lower surface with parallel grooves 7 7, which are disposed on the sides of the lug 6, these grooves receiving the ribs 5 5 of the calk 3. The lug 6 is formed with a recess 8, and the calk 3 is pierced at 9, and a cotter-pin 10 passes through the lug and engages with the recess 8 when the calk is in position on the shoe, so as to prevent the calk from moving longitudinally on the lug 6.

I claim—

A horseshoe having wedge-shaped lugs at its heel end, the narrowest portion of said lugs being toward the surface of the shoe, said lugs being formed with transverse recesses and the shoe-body having longitudinally-disposed grooves formed therein at opposite sides of the lugs, in combination with calk-pieces formed each with a dovetailed groove to receive the lug on the horseshoe, and with ribs adapted to enter the grooves in the horseshoe, each lug being provided with a transverse opening registering with the recess in the lug and a pin passing through said opening and fitting in said recesses to hold the calk against longitudinal movement on the lug.

In testimony whereof I affix my signature in the presence of two witnesses.

PHILIP JACOB HOFFMANN.

Witnesses:
C. J. HOFFMANN,
K. H. BUTLEN.